(12) United States Patent
Ichitani

(10) Patent No.: US 8,174,728 B2
(45) Date of Patent: May 8, 2012

(54) IMAGE PROCESSING METHOD AND DEVICE

(75) Inventor: Shuji Ichitani, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 847 days.

(21) Appl. No.: 12/299,913

(22) PCT Filed: Apr. 25, 2007

(86) PCT No.: PCT/JP2007/058931
§ 371 (c)(1), (2), (4) Date: Nov. 7, 2008

(87) PCT Pub. No.: WO2007/132652
PCT Pub. Date: Nov. 22, 2007

(65) Prior Publication Data
US 2009/0116070 A1    May 7, 2009

(30) Foreign Application Priority Data
May 12, 2006  (JP) .................................. 2006-133523

(51) Int. Cl.
G06F 1/00 (2006.01)
H04N 1/40 (2006.01)
(52) U.S. Cl. ......... 358/1.9; 358/518; 358/521; 358/523; 358/3.01
(58) Field of Classification Search .................... 358/1.9, 358/518, 521, 523, 504, 3.01
See application file for complete search history.

(56) References Cited

U.S. PATENT DOCUMENTS
6,088,038 A * 7/2000 Edge et al. ..................... 345/600
7,952,763 B2 * 5/2011 Borg ............................... 358/1.9

FOREIGN PATENT DOCUMENTS
JP 6242523 9/1994
JP 10341354 12/1998
JP 11146213 5/1999

* cited by examiner

Primary Examiner — Houshang Safaipour
(74) Attorney, Agent, or Firm — Lucas & Mercanti, LLP

(57) ABSTRACT

An image processing method for forming a color conversion table to convert plural input colors into output colors, the method including the steps of: extracting color values of plural gray scales wherein in input and output characteristic data, a signal value of one color is variable and signal values of other colors are fixed; creating a model with which difference values between input and output color values are outputted by inputting the extracted color values; and estimating the output color values corresponding to the input color values to create the color conversion table to convert plural input colors into output colors, after shifting the color values by adding or subtracting the difference values which are obtained by inputting the color values into the model with respect to every output color values.

8 Claims, 14 Drawing Sheets

IMAGE PROCESSING METHOD AND DEVICE

This is a U.S. National Phase Application under 35 U.S.C. 371 of International Application PCT/JP2007/058931, filed on Apr. 25, 2007, which claims the priority of Japanese Application No. 2006-133523, filed May 12, 2006, the entire content of both Applications are hereby incorporated by reference.

TECHNICAL FIELD

The present invention relates to a method and a device for determining a combination of four colors when conducting a color reproduction of a target color by combining four colors of Y (yellow), M (magenta), C (cyan) and K (black), and particularly to those improved in reproducibility by a method of deciding K amount.

BACKGROUND TECHNOLOGY

In cases where full color prints are conducted by printing, thermo-transfer, inkjet, and electrophotography, etc., generally used are four colors of MMCK as outputting colors of the color prints. Conventionally various methods are tried as the method of expressing a color by the use of four colors in calorimetric way.

For example there is a first method in which predetermined weighting is applied to a K amount of a color solid made by the condition of Y=0, M=0, and C=0 to determine a new K amount, and based on the value of the K amount, new Y, M, C amounts are determined in calorimetric way (Ninth Color Engineering Conference Collected Papers, Flexible URC using L*a*b*, the first report: an idea of new UCR capable to be applied on both character and halftone, by Shinji Kita, Sei Kokatsu, 1992).

As the second method, there is a method in which a combination of CMYK to reproduce a target color is obtained from among four color solids determined by the conditions of Y=0, M=0, C=0, and K=max (Refer to Unexamined Japanese Patent Application Publication No. HEI2-136848). By this method, total ink amount can be reduced by maximally using K amount as well as ensuring the maximum color gamut which is capable of being reproduced by four color printers.

As the third method, there is a method in which a combination of CMYK to reproduce a target color is obtained from among four color solids determined by the conditions of Y=max, M=max, C=max, and K=0 (Refer to Japanese Patent Application No. HEI4-266718). In this method K amount is minimally used and the total ink amount increases, though, noises are suppressed by the increase of used colors and a gradation is improved.

However, according to these various conventional methods, since positions are generated where K amount varies rapidly with in accordance with changes of the target colors, a common problem of generating false contours arises according to variations in printers. Although, an identical target color can be theoretically reproduced by combinations of YMCK with different K amounts, in actual, since there are variations in printers, errors may be generated in combinations of K amounts with large difference. Even in cases where the increasing/decreasing direction of brightness as the example of prescribed color element of the target color (which corresponds to density variation direction of the reproduced color) and the direction of increasing/decreasing direction of K amount are set in agreement with each other, non-smoothness may arise to cause the false contours in an rising area from no-use region to use region of K and in a boundary area where K amount is fixed to be maximum after going through smooth variation area.

Further, in cases where a combination of a function conversion by LUT (Look Up Table) and interpolation by an interpolation device is utilized for the conversion into image signals (CMYK) for reproducing the image signals (R, G, B, etc.) displayed on a target device such as CRT by a printer as a reproducing device, if the interpolation is executed based on the data of color cubic of both sides of the non-smoothness area, the interpolation error may become large, since between the data are non-smoothly connected with broken lines.

Further, in the first method, since among the combinations made by the condition of Y=0, M=0, and C=0, the K amount is calculated to reproduce the target color, there exists an area that cannot be inherently used among the maximum color gamut reproducible by a four color printer. Namely, when K amount is in maximum, up to two colors of YMC can be maximally used, but three colors cannot be used at a time.

Further, with respect to K amount to reproduce the target color, namely with respect to the maximum K amount obtained in the condition of Y=0, M=0, and C=0, if the ratio of K amount is arbitrarily determined, in case of the color near the boundary area of reproducible color gamut when K amount is decreased and replaced by the other three colors, for example in a condition of Y=0, K amount is 90 (max=100), and M, C>60, if K amount is decreased to be a half value 45, the amounts of Y, M, C is needed to be increased for compensation of decreased K amount and the amounts of M, C may exceed 100 to be outside the gamut, this disables the correct color reproduction.

On the other hand, as described above, in the third method K amount is utilized in minimum in order to increase the gradation, however, in actual there are cases where increased gradation is preferable and where decreased gradation is preferable. In the second or the third methods, by the restriction of utilizing the maximum or the minimum K amounts, there is no flexibility of adjusting the ratio of K amount according to colors in order to obtain a preferable image quality.

Regarding these method, Patent document 1 and Patent Document 2 described below are proposed.

Patent Document 1: Examined Japanese Patent Application Publication No. 3273204 (1$^{st}$ page, FIG. 1)

Patent Document 2: Unexamined Japanese Patent Application Publication No. 2001-169131 (1$^{st}$ page, FIG. 1)

DISCLOSURE OF THE INVENTION

Problems to be Solved by the Present Invention

In the above Patent document 1, the maximum K and the minimum K, which are able to reproduce L*a*b value, are obtained, and between the two values, the final K value is determined.

In the above Patent Document 2, K values and densities of input K values are preserved as output K values, and residual output CMY are obtained And, in cases where CMY are not zero, the values are compulsorily adjusted to be zero.

The method of Patent Document 1, is the method of calorimetrically obtaining CMYK values, but has a problem of not having a function of preserving K values.

Further the method of Patent Document 2, is capable of preserving the K values, however since in cases where CMY are not zero, the values are compulsorily adjusted to be zero, there is a problem of generating a tone-jump (discontinuous gradation).

The present invention is achieved with the above problems in the conventional technology in view, and an object of the present invention is to realize an image processing method and apparatus for forming a color conversion table which can prevent the generation of tone-jump and suppress the generation of color difference, by executing the processing of preserving K values when determining the combination of CMYK.

Means for Solving the Problems

The present invention to solve the above problems is as follows:

(1) The invention described in claim 1 is an image processing method for forming a color conversion table to convert plural input colors into output colors, including the steps of:

extracting color values of plural gray scales wherein in input and output characteristic data, a signal value of one color is variable and signal values of other colors are fixed;

creating a model with which difference values between input and output color values are outputted by inputting the extracted color values; and estimating the output color values corresponding to the input color values to create the color conversion table to convert plural input colors into output colors, after shifting the color values by adding or subtracting the difference values which are obtained by inputting the color values into the model with respect to every output color values.

(2) The invention described in claim 2 is an image processing method described in (1), wherein outputting of the difference values is executed only when the gray scales vary, and changing of output data is performed by multiplying a ratio of a color value of the gray scale and a result of adding or subtracting the difference value.

(3) The invention described in claim 3 is an image processing method described in (1), wherein the plural gray scales are K (black) mono-color gray scales in conditions of C (cyan)=M (magenta)=Y (yellow)=0, or any of gray scales of mono-colors including C (cyan) mono-color, M (magenta) mono-color, Y (yellow) mono-color, R (red) mono-color, G (green) mono-color, and B (blue) mono-color.

(4) The invention described in claim 4 is an image processing method described in (1), wherein in the model, with respect to the difference value between the input and output color values, the difference value of a gray scale at the last step or the difference values at some of the gray scales in the last step are made to be maximum, and the difference value of a gray scale at the first step or the difference values at some of the gray scales in the first step are made to be zero, while the difference values of a gray scale between the first and last steps are obtained by linearly or nonlinearly interpolating between the maximum value and zero.

(5) The invention described in claim 5 is an image processing method described in (1), wherein in the model, when color value of a prescribed gray scale is inputted the maximum difference value is outputted, and according to going apart from a chroma or an achromatic axis in the color value of the prescribed gray scale, the difference value is decreased.

(6) The invention described in claim 1 is an image processing device for forming a color conversion table to convert plural input colors into output colors, including:

an extraction section which extracts color values of plural gray scales wherein in input and output characteristic data, a signal value of one color is variable and signal values of other colors are fixed;

a model with which difference values between input and output color values are outputted by inputting the extracted color values;

an estimation section which estimates the output color values corresponding to the input color values to create the color conversion table, after shifting the color values by adding or subtracting the difference values which are obtained by inputting the color values into the model with respect to every output color values.

(7) The invention described in claim 7 is an image processing device described in (6), wherein outputting of the difference values is executed only when the gray scales vary, and changing of output data is performed by multiplying a ratio of a color value of the gray scale and a result of adding or subtracting the difference value.

(8) The invention described in claim 8 is an image processing device described in (6), wherein the plural gray scales are K (black) mono-color gray scales in conditions of C (cyan)=M (magenta)=Y (yellow)=0, or any of gray scales of mono-colors including C (cyan) mono-color, M (magenta) mono-color, Y (yellow) mono-color, R (red) mono-color, G (green) mono-color, and B (blue) mono-color.

(9) The invention described in claim 9 is an image processing device described in (6), wherein in the model, with respect to the difference value between the input and output color values, the difference value of a gray scale at the last step or the difference values at some of the gray scales in the last step are made to be maximum, and the difference value of a gray scale at the first step or the difference values at some of the gray scales in the first step are made to be zero, while the difference values of a gray scale between the first and last steps are obtained by linearly or nonlinearly interpolating between the maximum value and zero.

(10) The invention described in claim 10 is an image processing device described in (6), wherein in the model, when color value of a prescribed gray scale is inputted the maximum difference value is outputted, and according to going apart from a chroma or an achromatic axis in the color value of the prescribed gray scale, the difference value is decreased.

Effect of the Invention

According to the image processing method and the image processing device of the present invention, the effects described below can be obtained.

(1) According to the invention of the image processing method as described in claim 1, a color conversion table can be created with which a specific color (such as K) is preserved and continuity is not deteriorated.

(2) According to the invention of the image processing method as described in claim 2, a color conversion table can be created with which a specific color (such as K) is preserved and continuity is not deteriorated, and by applying the difference value of each gray scale to every data where the difference value is fixed and other signal values vary, the number of times for calculation can be decreased.

(3) According to the invention of the image processing method as described in claim 3, by preserving not only K but also C, M, Y, R, G, and B, pure (other color being not mixed) reproduction of black characters and color characters becomes possible.

(4) According to the invention of the image processing method as described in claim 4, by setting the degree of preservation depending on the number of gray scale steps to be preserved, the degree of preservation can be controlled, this leads to suppressing the increase of color difference which is generated by the adjustment.

(5) According to the invention of the image processing method as described in claim 5, by decreasing the difference value in accordance with drawing apart from the axis of the gray scale to be adjusted, roughness in color reproduction can suppressed.

(6) According to the invention of the image processing device as described in claim 6, a color conversion table can be created with which a specific color (such as K) is preserved and continuity is not deteriorated (7) According to the invention of the image processing device as described in claim 7, a color conversion table can be created with which a specific color (such as K) is preserved and continuity is not deteriorated, and by applying the difference value of each gray scale to every data where the difference value is fixed and other signal values vary, the number of times for calculation can be decreased.

(8) According to the invention of the image processing device as described in claim 8, by preserving not only K but also C, M, Y, R, G, and B, pure (other color being not mixed) reproduction of black characters and color characters becomes possible.

(9) According to the invention of the image processing device as described in claim 9, by setting the degree of preservation depending on the number of gray scale steps to be preserved, the degree of preservation can be controlled, this leads to suppressing the increase of color difference which is generated by the adjustment.

(10) According to the invention of the image processing device as described in claim 10, by decreasing the difference value in accordance with drawing apart from the axis of the gray scale to be adjusted, roughness in color reproduction can suppressed.

EXPLANATION OF THE NOTATION

100 Image processing device
110 Interpolating device
120 Color conversion table

DETAILED DESCRIPTION OF THE PREFERRED EMBODIMENT

By referring the drawings, the best mode (hereinafter referred as embodiment) for enforcing the present invention will be described below.

<Outline of Image Processing>

Here, the embodiment is shown by utilizing the case of creating a 4-dimensional LUT (Look Up Table) of CMYK->CMYK as a specific example. The device outputting target color signals is referred as "target device", and the device reproducing the target color is referred as "reproducing device".

Figure 3:
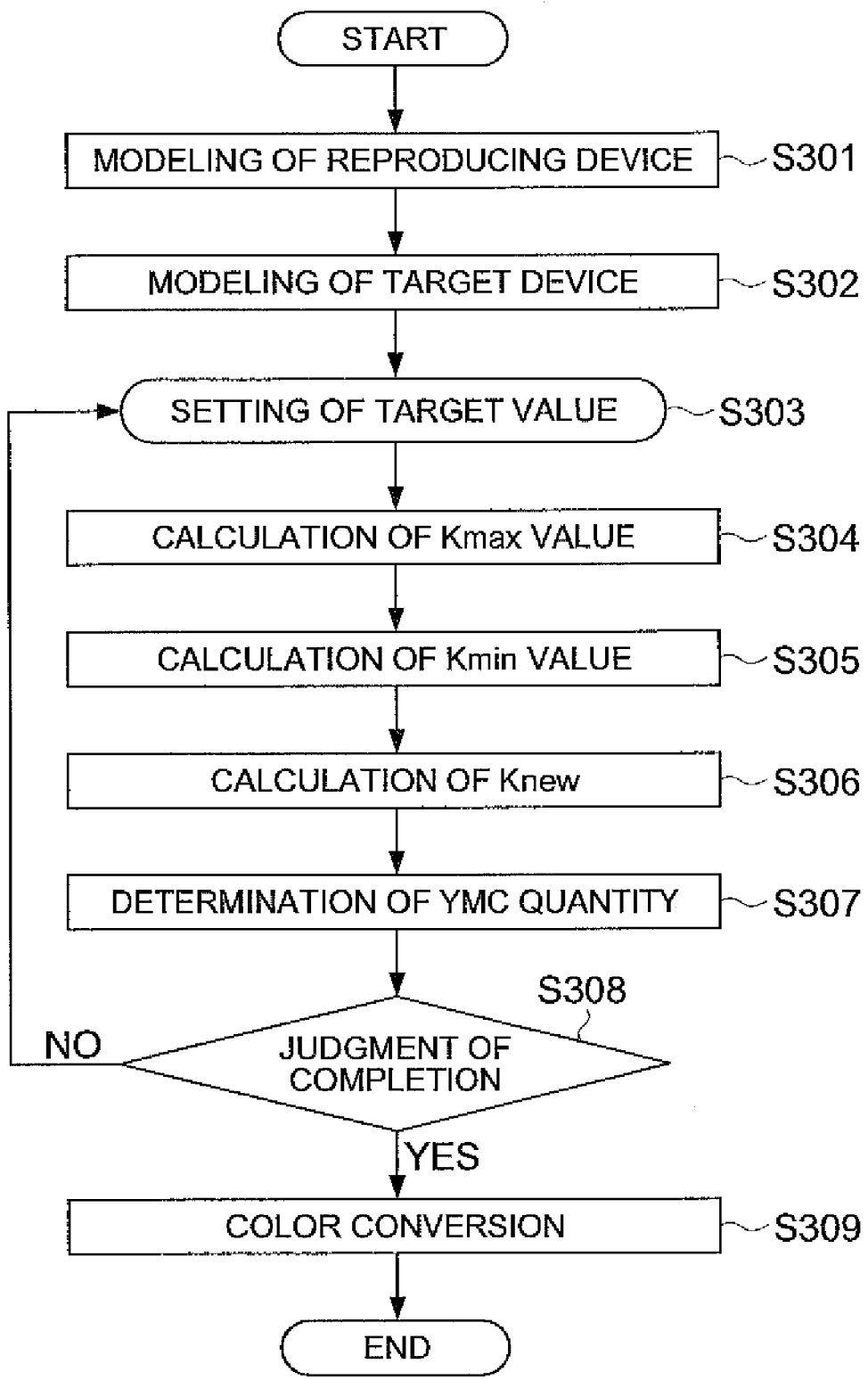
FIG. 3 is a schematic diagram showing the image processing of the embodiment of the present embodiment.

As a similar LUT creating method, the flow chart of FIG. 3 showing the method of Patent Document 1 is represented.

Since the conventional method shown by the flow chart in FIG. 3 is an example of creating RGB->CMYK three-dimensional LUT, the following explanation is made by assuming CMYK as target side signals.

In this case, if the modeling of the target device (Step S302 in FIG. 3) is executed similarly to the modeling of the reproducing device (Step S301 in FIG. 3), CMYK->CMYK four-dimensional LUT can be created through the same subsequent flow.

Here, in the CMYK->CMYK four-dimensional LUT, regarding the gray scale input of variable K with C=M=Y=0, it is important that the output values become such that C=M=Y=0 with the same K, or with the K which makes a color value same as the input color value. This is because in the reproduction of black characters inputted with mono-color K, if CMYK values are mixed quality of the black characters will be degraded.

Figure 4:
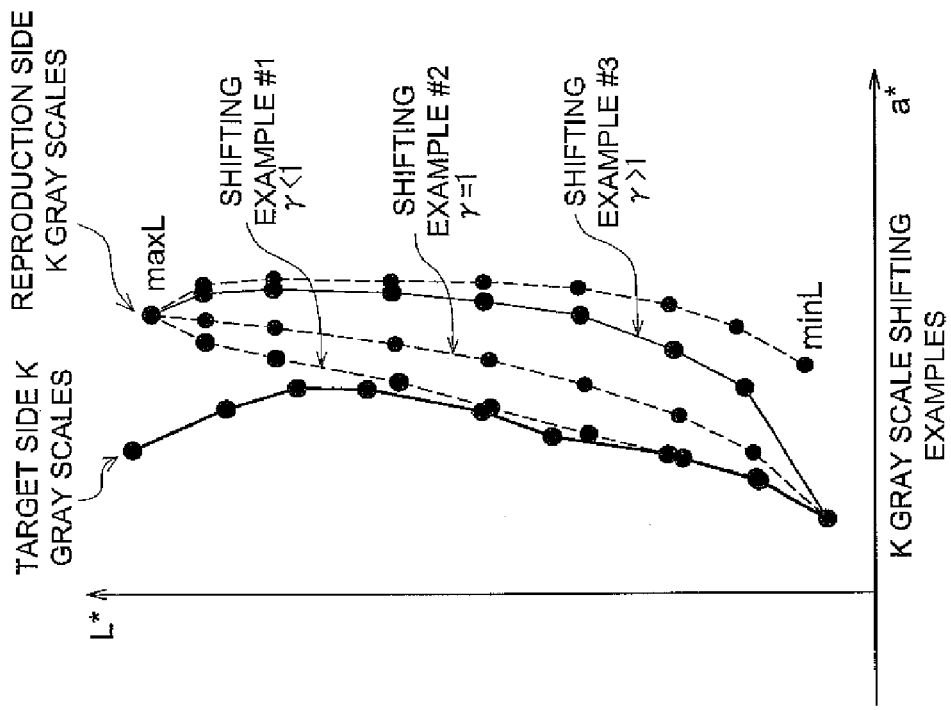
FIG. 4 is a schematic diagram showing the image processing of the embodiment of the present embodiment.
Figure 4:
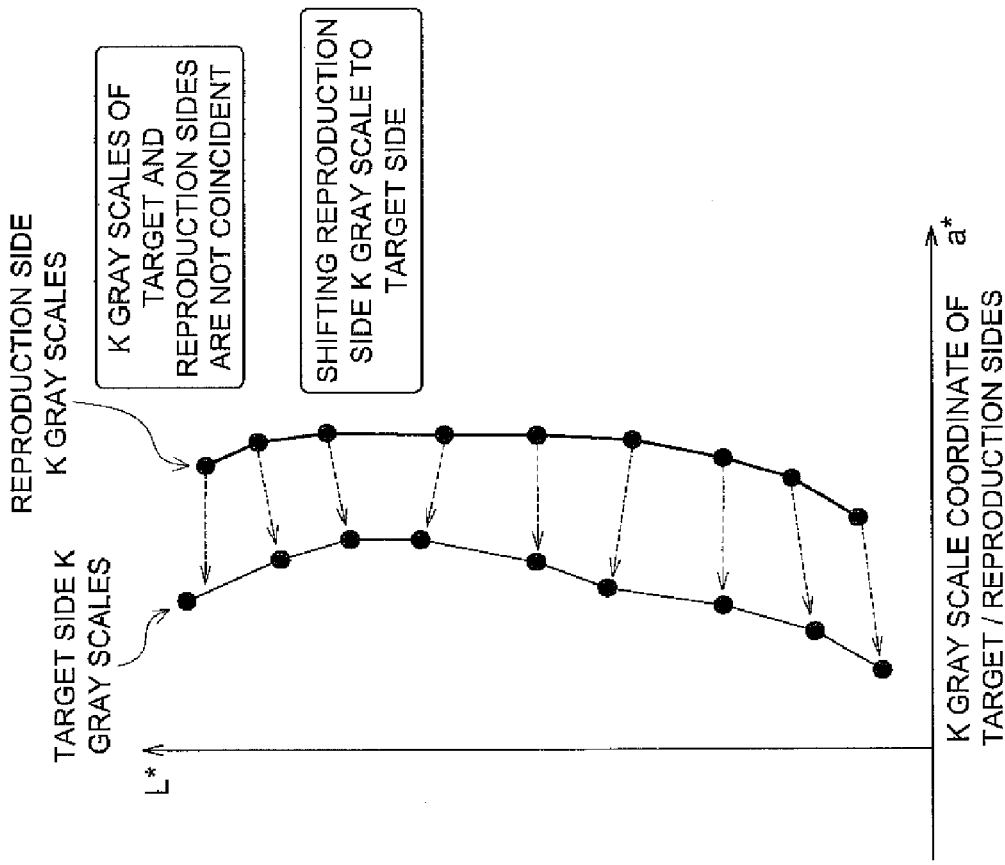

When CMYK values are not mixed, even if K value differs from the input value, this will not cause a problem. And rather the K value which makes a color value same as the input side color value is regarded to be important. In the conventional method shown by the flow chart in FIG. 3, in order to reproduce with C=M=Y=0, and with certain K values, although the most liable way is using maximum black in determining New K, the characteristic diagram of FIG. 4 can be obtained by plotting input/output color value in condition of C=M=Y=0, with variable K values (hereinafter will be referred to as K mono-color gray scale).

Figure 5:
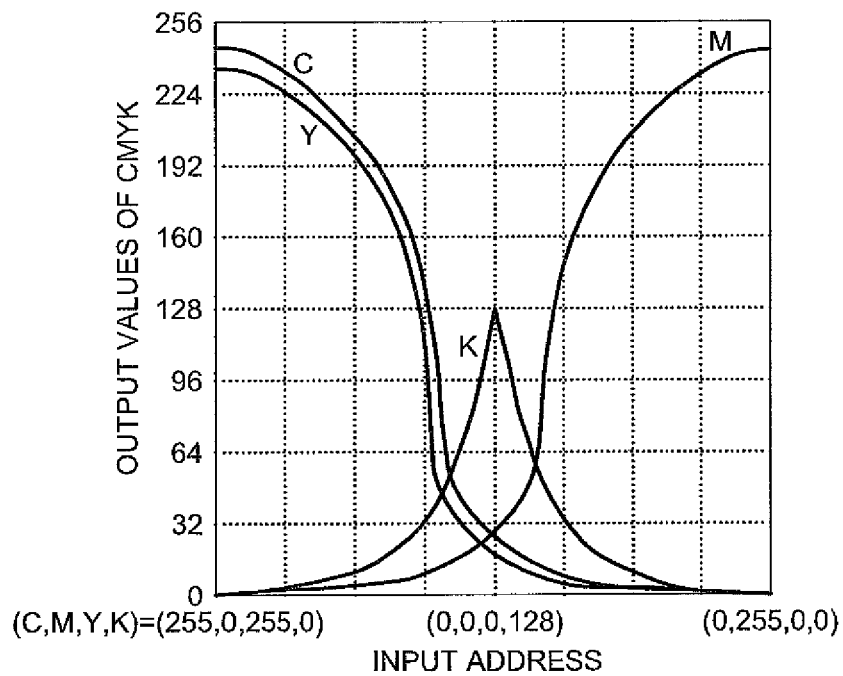
FIG. 5 is a schematic diagram showing the image processing of the embodiment of the present embodiment.

Even with the same K mono-color gray scale, if the black color material or the paper used in the input/output device varies, the color values differ even with the same value. In this case, in order to reproduce K mono-color gray scale input in colorimetric method, CMY values are surely required. For example, in the case of the gradation input which varies from green through gray (C=M=Y=0, K=128 (in the case of 8 bit)) and to magenta, the CMYK values after conversion become as shown in the characteristic diagram of FIG. 5, where the output value at the portion of C=M=Y=0, K=128 (central portion of the horizontal axis of FIG. 5), CMYK values are to some extent mixed in the output value.

Figure 6:
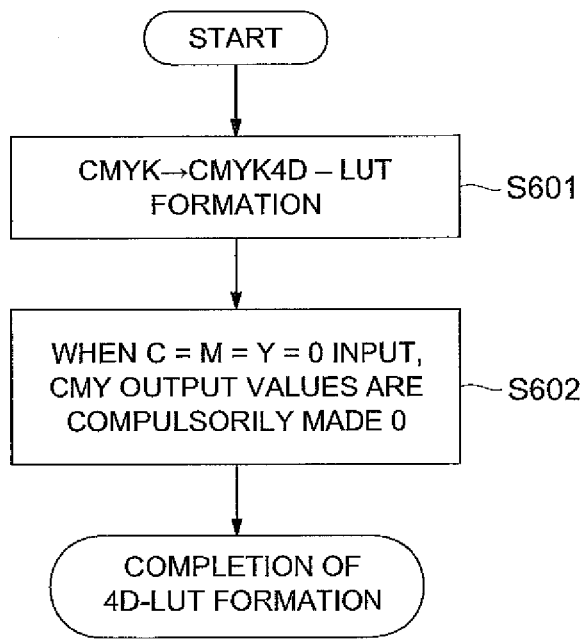
FIG. 6 is a schematic diagram showing the image processing of the embodiment of the present embodiment.

Similar phenomenon arises in the conventional method described in JP2001-169131A. In order to solve this problem, as shown in the flow chart of FIG. 6, in conventional method, the processing of compulsorily making CMY values zero (Step S602 in FIG. 6) in the K mono-color gray scale is adopted after the creation of the CMYK->CMYK four-dimensional LUT (Step S601 in FIG. 6).

Figure 7:
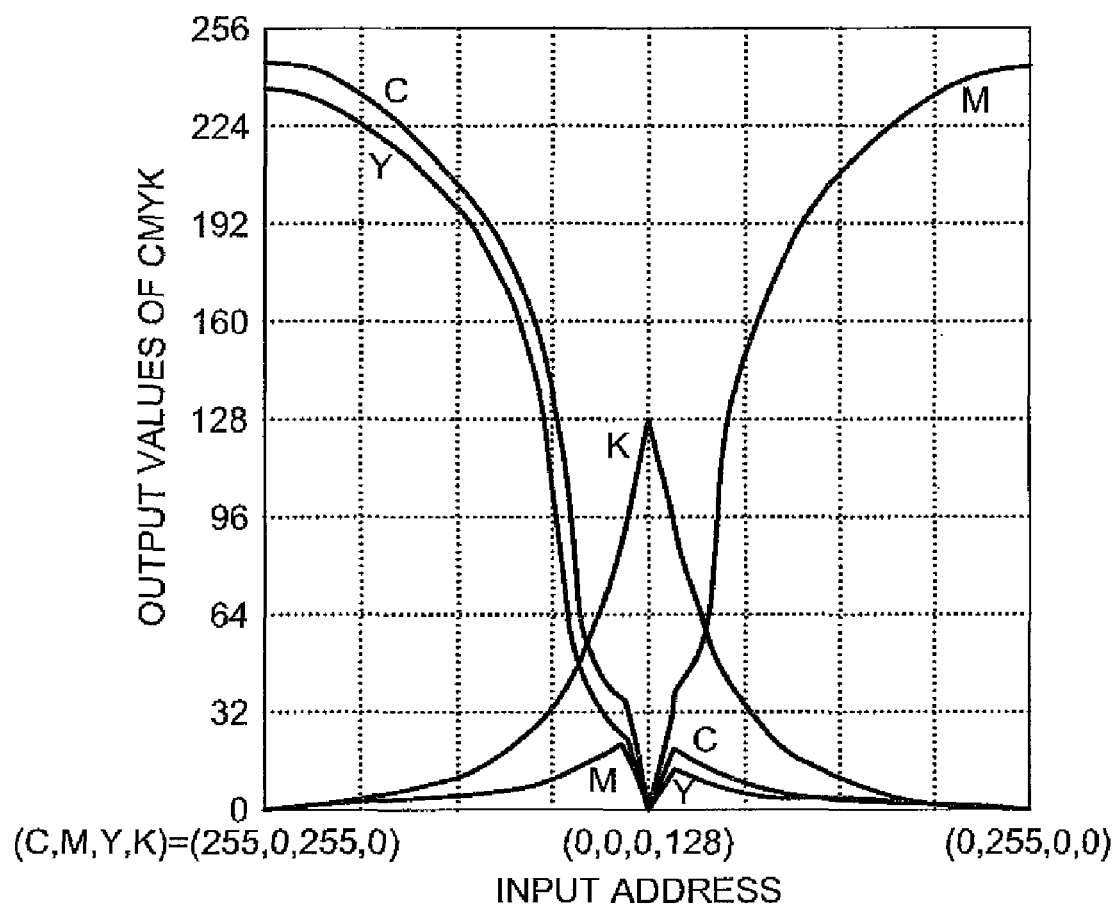
FIG. 7 is a schematic diagram showing the image processing of the embodiment of the present embodiment.

By doing this, the reproduction of black characters improves, however the following problem arises. For example, in the case of the gradation input which varies from green through gray (C=M=Y=0, K=128 (in the case of 8 bit)) and to magenta, the CMYK values after conversion become as shown in the characteristic diagram of FIG. 7. In this case, although the reproduction at the gray portion is done by (C=M=Y=0), at the peripheral portion there are rapid change and continuity of the characteristic is destroyed to generate tone jump (discontinuous gradation).

Here, as an embodiment of the present invention, the method of preserving K amount as well as keeping the continuity of gradation will be described referring to the flowchart of FIG. 1 and the block diagram of FIG. 2.

<General Procedure of the Image Processing>

Figure 2:
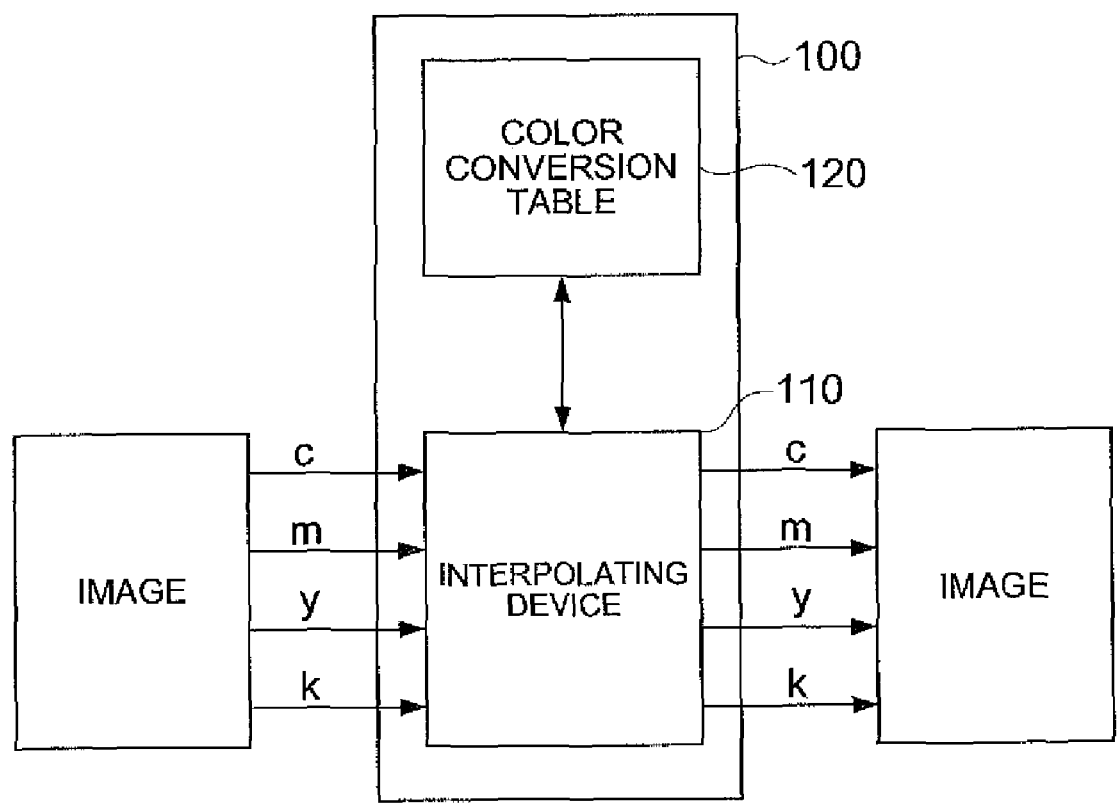
FIG. 2 is a block diagram representing a structure of the image processing device of the first embodiment of the present invention.

FIG. 2 is a block diagram of image processing device 100. Image processing device 100, which is inputted with target color signals cmyk from the target device and outputs reproducing signals cmyk to the reproducing device, is configured with interpolating device 110 for interpolating color signals and color conversion table 120 having four-dimensional LUT.

(1) Modeling of Reproducing Device

Figure 1:
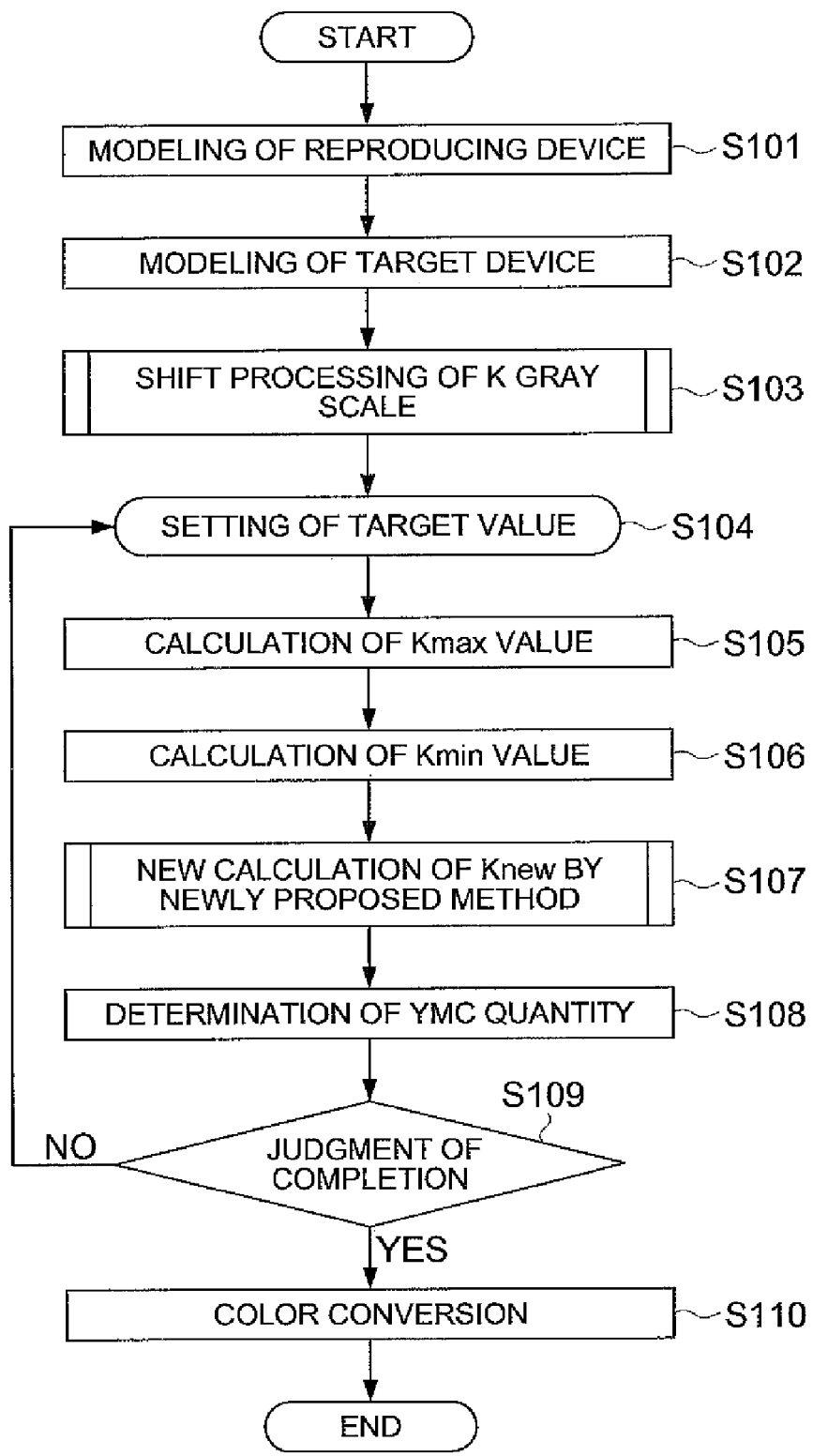
FIG. 1 is a flow chart representing an operation of the image processing method and device of the first embodiment of the present invention.

First, by an arbitrary method, modeling of a reproducing device is executed, namely, a function formula which converts CMYK values into tristimulus values X,Y,Z is set (Step S101 in FIG. 1). For example, the conversion formula between CMYK values to X,Y,Z values may be obtained by creating a color patch where CMYK are quantized as disclosed in JP1990-26388A, actually measuring this color patch, and obtaining tristimulus values X,Y,Z corresponding to the measured color values. The other method such as a modeling by a multiple regression analysis, Neugebauer equation, or Lambert-Beer rule may be utilized to obtain the conversion formula.

Here, as color conversion table 120 in image processing device 100 of FIG. 2, a four-dimensional LUT having such as CMYK->XYZ values or L*a*b values is created. Color values may be XYZ, L*a*b, Luv, LMS, or RGB.

(2) Modeling of Target Device

Similarly, by an arbitrary method, obtained is the relationship between the tristimulus XYZ and the system values of the target device (color separation signal values such as C, M, Y, K), which displays an image with a target color, or outputs target color image signals, then a function formula of conversion is obtained (Step S102 in FIG. 1).

For example, 4-D (four dimensional) LUT having a function of CMYK->XYZ values or L*a*b values is created.

As the method of obtaining the function formula for conversion, other than the method described above regarding the reproducing device, a modeling can be executed by 3×3 matrix in TV. Then the tristimulus values corresponding to the system values of arbitrary combination of the target device are obtained by utilizing the above mentioned modeling method. This may be further converted into an orthogonal coordinate system correlated to LCH of an adequate color vision model (for example, CIELAB, CIELUV, Hunt, or Nayatani model).

(3) Sift Processing of K Gray Scale

Here, an example of making an agreement in K mono-color gray scale will be described, but other gray scales such as C, M, Y gray scales may be also applicable. After extracting the color values of K mono-color gray scale in input/output 4-D LUT which have been created by the above (1) Modeling of Reproducing Device and (2) Modeling of Target Device, the L*a*b values in CMYK->L*a*b are shifted such that the color values of the output side and the input side conform with each other (Step S103 in FIG. 1). Detailed explanation will be described bellow at K grayscale shift processing #1, and K grayscale shift processing #2.

(4) Setting of Target Values

The steps of processing, through to (9) Judgment of Completion, are repeated for number of times of lattice points number (Step S104 in FIG. 1).

Here, the input CMYK value and its color value are treated as a set to proceed to the processing of (5) and after.

(5) Calculation of Kmax

From a gamut of colors formed by the four conditions of Y=0, M=0, C=0, and K=max, K amount is determined for calorimetric reproduction of input color values, and this K amount is assumed to be Kmax (Step S105 in FIG. 1).

Namely, by the combinations of CMYK for target colors obtained from the combination of CMYK under the four conditions of Y=0, M=0, C=0, and K=max, the K amount (Kmax) is obtained, which is made maximum by the combination expressing the target colors.

Here, from a color solid formed by the conditions of Y=0, M=0, C=0, and K=max, the combination of CMYK reproducing the target color is calculated. As for this calculation method the method disclosed in "P. Hung, IS & T Final Program and Advance Printing of Paper summaries, P. P. 419-422 (1992)" can be utilized. K amount obtained above is assumed to be Kmax.

(6) Calculation of Kmin

From a gamut of colors formed by the four conditions of Y=max, M=max, C=max, and K=0, K amount is determined for colorimetric reproduction of input color values, and this K amount is assumed to be Kmin (Step S106 in FIG. 1).

Namely, from a color solid formed by the conditions of Y=max, M max, C=max, and K=0, the combination of CMYK reproducing the target color is calculated. The same method of calculation as the method utilized in the above conditions can be applied. K amount in this case is assumed to be Kmin.

As for this calculation method the method disclosed in "P. Hung, IS & T Final Program and Advance Printing of Paper summaries, P.P. 419-422 (1992)" can be utilized. K amount obtained above is assumed to be Kmin.

(7) Calculation of Knew

Although, in the conventional example, Knew=$(1-\alpha)$*Kmin+$\alpha$*Kmax is utilized, in the present proposed method, $\alpha$ is determined in the manner described below such that Kmax is applied on the gray axis and Kmin is applied as going farther from the gray axis (Step S107 in FIG. 1). Details will be explained in the section "Calculation of Knew #1".

(8) Calculation of YMC Quantity

Based on the above determined Knew, from output CMYK 4-D LUT, a CMY->XYZ (or L*a*b color values) 3-D LUT is created, which is structured with CMY with fixed K, and by the use of the 3-D LUT, CMY values to reproduce the color values set in the above (4) are determined (Step S108 in FIG. 1).

Namely, based on the new K amount determined as described above, a combination of other three colors Y, X, C to reproduce the target color is calculated.

According to this calculation in the case of 4-D LUT, 3-D LUT is calculated from the 4-D LUT by interpolation with fixing the K value, and after that, the conventional method is utilized. Finding out the solution of the combination is guaranteed by the fact that the target color can be reproduced with the given K amount. As for the three dimensional values, the calculating method described in the above mentioned reference "P. Hung, IS & T Final Program and Advance Printing of Paper summaries, P.P. 419-422 (1992)" can be utilized. The combination of CMYK calculated as above is stored in a memory.

(9) Judgment of Completion

Judgment is done whether the steps of processing (4) through (8) are repeated for number of times of lattice points number (Step S109 in FIG. 1), and if not completed, return to step (4).

(10) Color Conversion

By repeating the above processing, the combinations of CMYK, corresponding to every target color data having been sampled, are obtained to create CMYK->CMYK 4-D LUT (color conversion table 120). Namely, based on the data obtained in this way, LUT of the combinations of CMYK are created corresponding to the input image signals from the target device.

By executing the color conversion with the created CMYK->CMYK 4-D LUT (color conversion table 120) and interpolating device 110, CMYK images are outputted (Step S110 in FIG. 1).

Here, as shown in FIG. 2, by combining the color conversion table 120 and the interpolating device 110, based on the image signals inputted from the target device, the combination data of CMYK in the vicinity of the target color is looked up from the color conversion table 120, and is interpolated by the interpolating device 110 to determine CMYK (C'M'Y'K') corresponding to the target color. An example of this method is disclosed such as in JP1990-226867A, which can be utilized.

Figure 8:
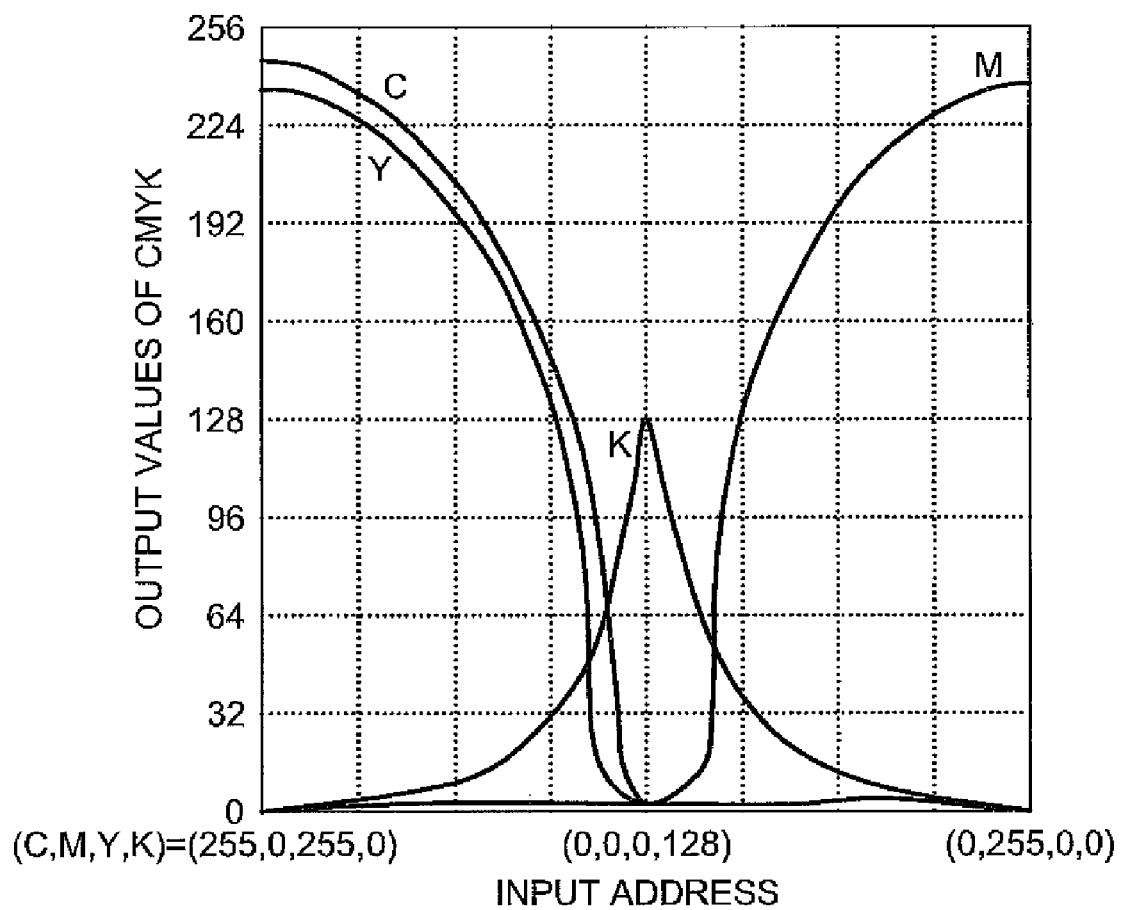
FIG. 8 is a schematic diagram showing the image processing of the embodiment of the present embodiment.

By this, K mono-color gray scale in the image becomes capable of being outputted with K mono-color gray scale in the output side as well. The reproduction result of the input values, which changes from green through gray and to magenta, is shown in the characteristic diagram of FIG. 8. By using this method a color conversion table can be created, with which K mono-color gray scale can be reproduced by K mono-color gray scale (near the central portion of the horizontal axis in FIG. 8), and the color conversion table having good continuity without a rapid characteristic change.

<Detailed Procedure of the Image Processing (1)>

(3-1) K Gray Scale Shift Processing #1

Here, referring to FIG. 9, the detailed procedure of the image processing will be described.

(3-1-1) Extraction of K Mono-Color Gray Scale of Reproducing Device

Here, explained as an example is the case where CMYK->CMYK 4-D LUT has nine steps of 9*9*9*9 lattice for each axis.

First of all, as an extraction of K mono-color gray scale of reproducing device (Step S901 in FIG. 9), L*a*b values are extracted in cases where K varies from 0 to 8 with C=M=Y=0.

Those values are assumed to be outK0_lab, outK1_lab, outK2_lab, outK3_lab, outK4_lab, outK5_lab, outK6_lab, outK7_lab, outK8_lab.

(3-1-2) Extraction of K Mono-Color Gray Scale of Target Device

Similarly to the case of reproducing device, extraction of K mono-color gray scale is set as follows (Step S902 in FIG. 9).

Those values are assumed to be inK0_lab, inK1_lab, inK2_lab, inK3_lab, inK4_lab, inK5_lab, inK6_lab, inK7_lab, inK8_lab.

Figure 10:
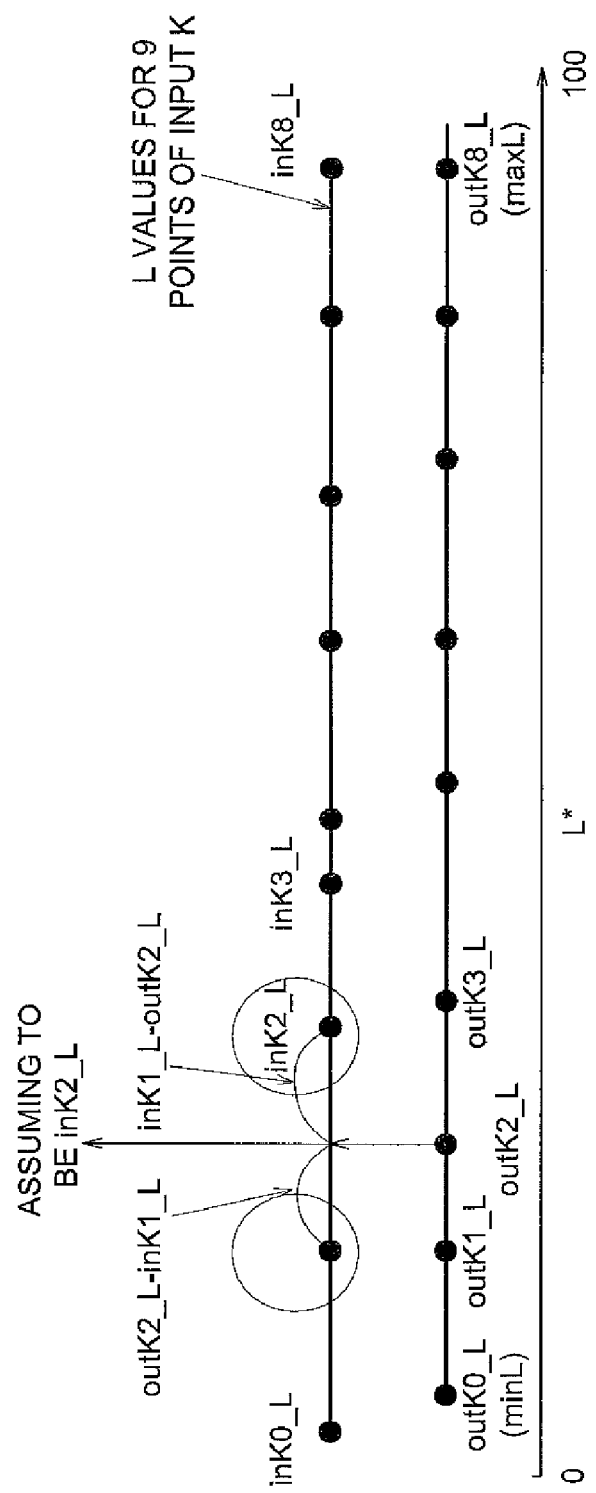
FIG. 10 is a schematic diagram showing the image processing of the embodiment of the present embodiment.

The above extraction of K mono-color gray scale of reproducing device and the extraction of K mono-color gray scale OF target device are shown as a drawing of FIG. 10.

(3-1-3) Calculation of K Gray Scale DIFF

Here, L values obtained by the extraction of K mono-color gray scale of reproducing device and L values obtained by the extraction of K mono-color gray scale of the target device are represented in a graph of FIG. 10. Here, the DIFF in each nine gray scales between reproducing side and target side is calculated (Step S903 in FIG. 9).

As shown in FIG. 10, L value of each outKx_lab (x is 0-8) is inputted, and determined is between which of inKx_lab the inputted outKx_lab value positions, and inKx_lab values at both sides are determined.

When the number x at both sides inKx_lab are 1 and 2, the L*a*b values of inK1_lab, inK2_lab, are interpolated by the L values of outKx_lab (x is 0-8). This interpolated value is referred to inKx_lab.

$$\text{inKx\_lab} = \{(\text{inK2\_L}-\text{outKx\_L})*\text{inK1\_lab}+(\text{outKx\_L}-\text{inK1\_L})*\text{inK2\_lab})\}/(\text{inK2\_L}-\text{inK1\_L}),$$

The value obtained by subtracting the value of outKx_lab (x is 0-8) from inKx_lab (x is 0-8) is referred to Diff_Kxlab (x is 0-8). By repeating this with varying x from 0 to 8, the shifting amounts for nine gray scales are calculated, which depend on the L values.

Figure 11:
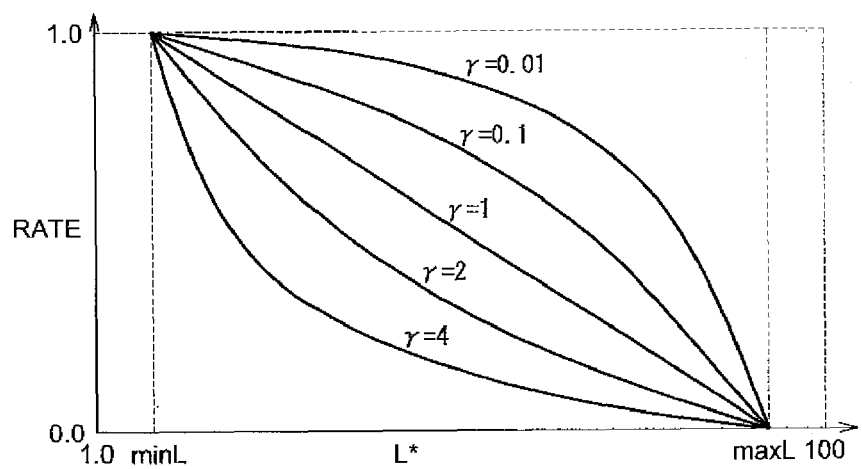
FIG. 11 is a schematic diagram showing the image processing of the embodiment of the present embodiment.
Figure 11:
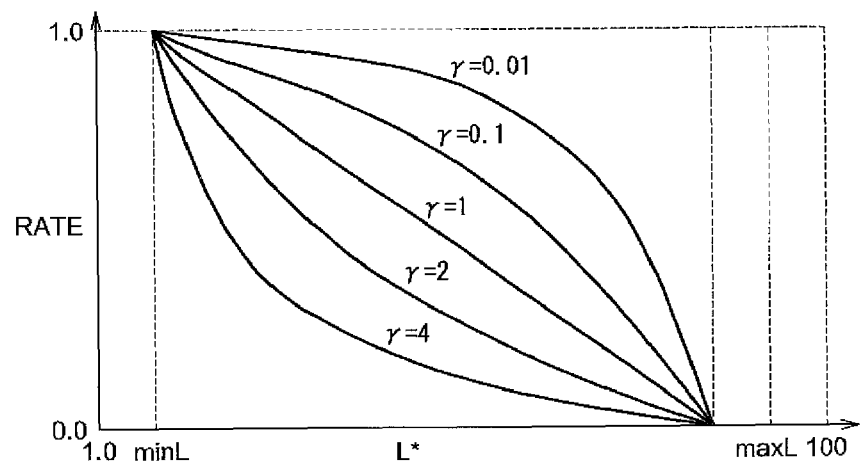
Figure 11:
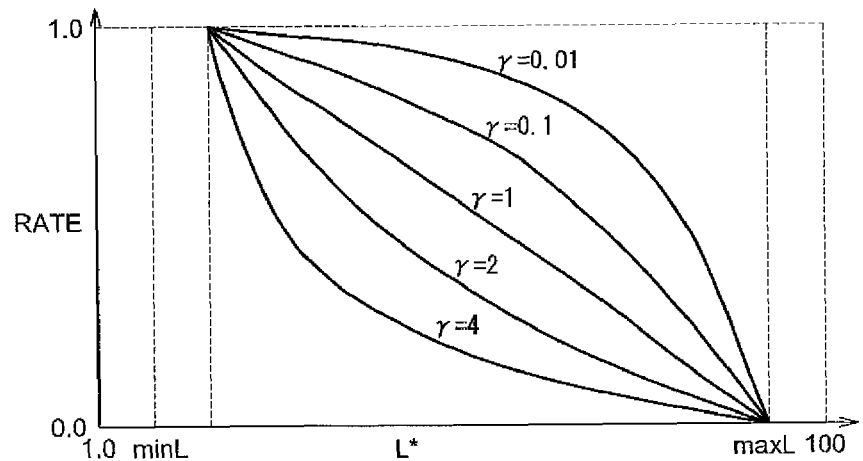

Diff_Kx_lab=inKx_lab−outKx_lab, (x is 0-8), where the shifting value can be varied by adjusting Diff_Kx_lab (x is 0-8) according to the gray scales. By assuming the L in outK0_lab as minL, and L in outK8_lab as maxL, the rate (RATE) is calculated as shown in FIG. 11(a). As shown in FIG. 11(a), if γ=1, at minL the rate becomes 1, and at maxL the rate becomes 0. By multiplying this to the obtained Diff_x_lab (x is 0-8), the shifting amount which depends on L values can be changed. By the setting shown in FIG. 11(a), when K is 100% in K gray scale, the shifting amount becomes to be maximum to completely shift the black characters, and as the black characters become pale the shifting becomes less. Further by varying the γ, the shifting amount for each gray level can be adjusted. Thus, by shifting the black characters and not shifting the other portion, colorimetry can be maintained. Further, smooth adjustment can be achieved.

In the case of FIG. 11(a), the rate at maxL has been assumed as 0, however the rate other than 0 will do as well. Further, L at outK8_lab has been assumed as maxL, L can be set to be other gray scale as shown in FIG. 11(b). Further, as shown in FIG. 11(c), L can be similarly set for minL.

(3-1-4) Value Setting

Figure 9:
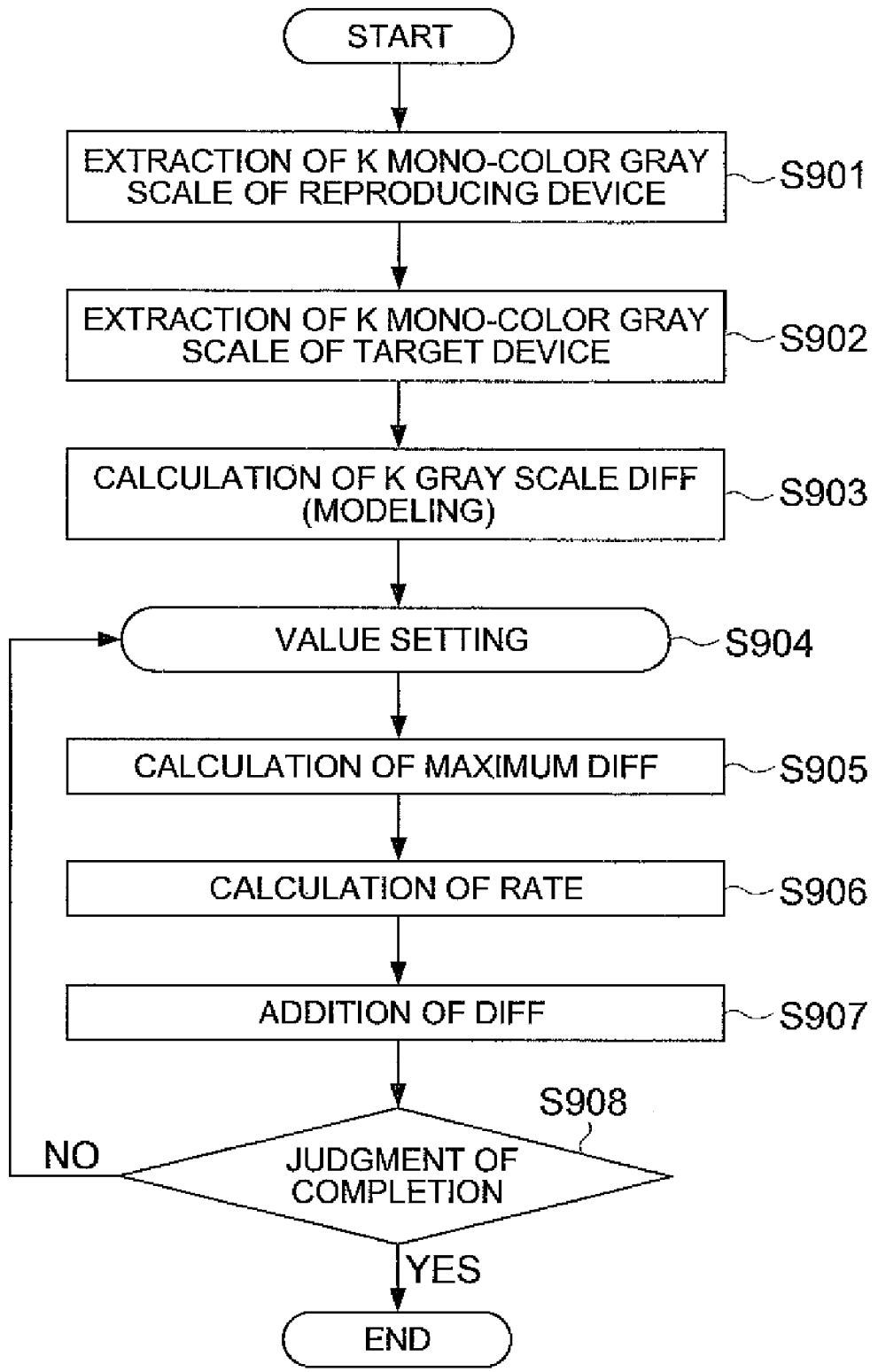
FIG. 9 is a schematic diagram showing the image processing of the embodiment of the present embodiment.

In the step of value setting, each value of 9*9*9*9 lattice points is sequentially set (Step S904 in FIG. 9). In this procedure, in the processing from (3-1-5) to (3-1-7), CMYK->CMYK 4-D LUT of the reproducing device is actually moved. The L*a*b value having been set is assumed to be In_lab.

(3-1-5) Calculation of Maximum DIFF

Based on the magnitude relation between L value of In_lab and L value of Kx_lab (x is 0-8), DIFF at In_lab, namely the maximum DIFF, is obtained through interpolation (Step S905 in FIG. 9).

$$\text{maxDiff\_lab} = \{(\text{outK1\_L}-\text{in\_L})*\text{Diff\_K2\_lab}+(\text{in\_L}-\text{outK2\_L})*\text{Diff\_K1\_lab})\}/(\text{outK2\_L}-\text{outK1\_L}),$$

This is the L value of In_lab, and becomes Maximum maxDiff_lab.

(3-1-6) Calculation of Rate

Here, in order to generate maximum shifting amount at K mono-color gray scale, the processing is executed such that the shifting amount is decreased according as a, b values go farther (Step S906 in FIG. 9).

Similarly to the case of FIG. 10, by inputting L value of In_ab, determining magnitude relation of L values of out- Kx_ab (x is 0-8), obtained is the center value of a, b which is to be maximally shifted in In_lab. Where, center_ab has "a" value and "b" value.

$$center\_ab\_=\{(outK1\_L-in\_L)*outK2\_ab+(in\_L-outK2\_L)*Diff-K1\_ab)\}/(outK2\_L-outK1\_L),$$

Figure 12:
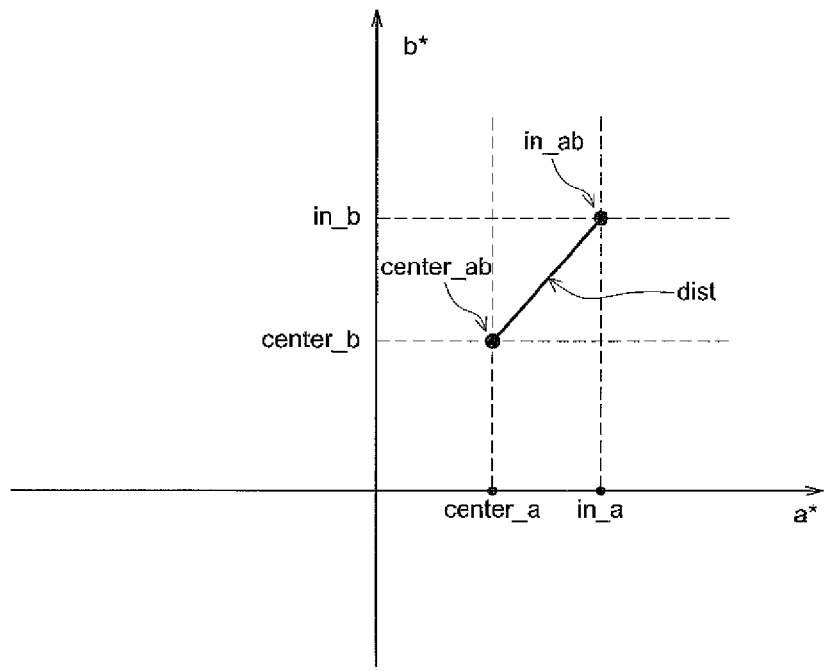
FIG. 12 is a schematic diagram showing the image processing of the embodiment of the present embodiment.

Next, as shown in FIG. 12, from a, b value of In_lab and center_ab the distance from the center is obtained.

$$dist=\{(In\_a-center\_a)^2+(In\_b-center\_b)^2\}^{1/2},$$

Figure 13:
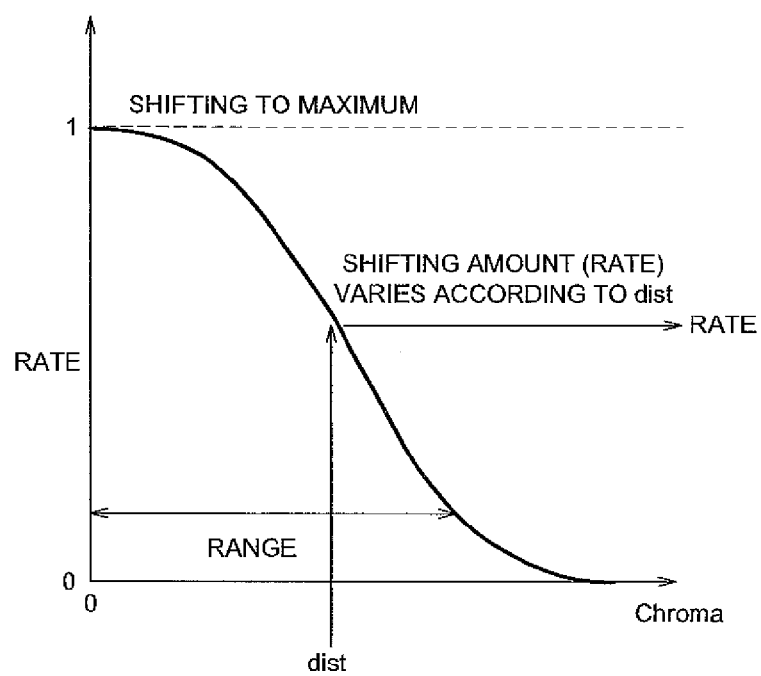
FIG. 13 is a schematic diagram showing the image processing of the embodiment of the present embodiment.

Next, as shown in FIG. 13, "rate" is obtained such that it becomes maximum at the center. The rate in FIG. 13 can be obtained by the Gaussian formula below, but other formula can be also utilized.

$$rate=1*exp(-1*\pi*(dist/100\cdot)^2);$$

(3-1-7) Addition of DIFF

By multiplying maxDiff_lab obtained in (3-1-5) with the rate obtained in (3-1-6), and adding the quotient to In_lab, the new L*a*b value can be obtained (Step S907 in FIG. 9).

$$NewL*a*b=In\_ab+rate*maxDiff\_lab$$

(3-1-8) Judgment of Completion

Here, judgment of completion is executed (Step S908 in FIG. 9). Namely the judgment is executed whether the calculation for every lattice of CMYK->L*a*b 4-D LUT has been completed. If not completed, return to Step S904 to repeat.

<Detailed Procedure of the Image Processing (2)>

(3-2) K Gray Scale Shift Processing #2

Here, referring to FIG. 14, the detailed procedure of the image processing will be described.

(3-2-1) Extraction of K Mono-Color Gray Scale of Reproducing Device

Here, explained as an example is the case where CMYK->CMYK 4-D LUT has nine steps of 9*9*9*9 lattice for each axis.

First of all, as an extraction of K mono-color gray scale of reproducing device (Step S1401 in FIG. 14), L*a*b values are extracted in cases where K varies from 0 to 8 with C=M==0.

Those values are assumed to be outK0_lab, outK1_lab, outK2_lab, outK3_lab, outK4_lab, outK5_lab, outK6_lab, outK7_lab, outK8_lab.

(3-2-2) Extraction of K Mono-Color Gray Scale of Target Device

Similarly to the case of reproducing device, extraction of K mono-color gray scale is set as follows (Step S1402 in FIG. 14).

Those values are assumed to be inK0_lab, inK1_lab, inK2_lab, inK3_lab, inK4_lab, inK5_lab, inK6_lab, inK7_lab, inK8_lab.

The above extraction of K mono-color gray scale of reproducing device and the extraction of K mono-color gray scale are shown as a drawing of FIG. 10.

(3-2-3) Calculation of K Gray Scale Rate

Figure 14:
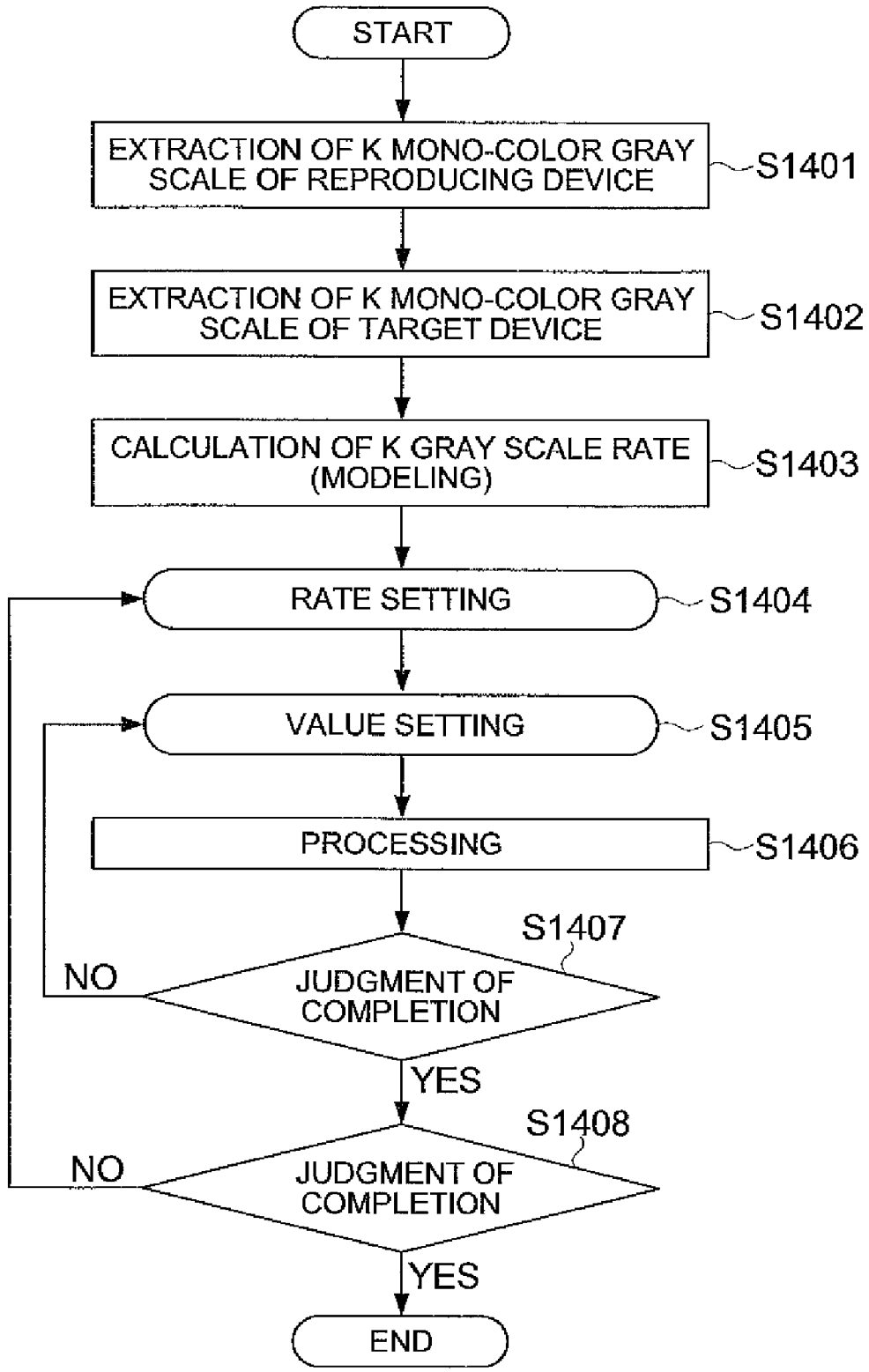
FIG. 14 is a schematic diagram showing the image processing of the embodiment of the present embodiment.

Until the step of setting inKx_lab, the procedure is same as the above described Detailed Procedure (1) (Step S1403 in FIG. 14).

Next, inKx_lab_ (x=0 to 8) and outKx_lab (x=0 to 8) are converted into XYZ (or LMS etc.). L*a*b may not be converted.

Next, rate for nine steps are calculated, and the results are referred as Rate_xyz_x (x=0 to 8). Where x varies from 0 to 8.

$$Rate\_xyz\_x=inKx\_xyz\_/outKx\_xyz, (x=0\ to\ 8)$$

(3-2-4) Rate Setting

In this step, rate setting is repeated for number of times corresponding to the number of K mono-color gray scales, in this case repeated nine times (Step S1404 in FIG. 14).

In the first time, Rate_xyz, which will be used in the following processing 5-7, is set as Rate_xyz_0. Next, Rate_xyz_1, Rate_xyz_2 are sequentially set.

(3-2-5) Value Setting

In the step of value setting, with fixed inputK and varying CMY, setting are executed 9*9*9 times (Step S1405 in FIG. 14). The addresses of processing the output side CMYK->L*a*b are sequentially retrieved, and L*a*b values are converted to XYZ and the like similarly to the process of (3-2-3). This is referred as OldXYZ.

(3-2-6) Processing

Here, new XYZ values are calculated (Step S1406 in FIG. 14).

$$NewXYZ=OldXYZ*Rate\_xyz,$$

By executing this processing, the portion of output Side K mono-color gray scale is completely shifted to input side K mono-color gray scale, and other portions are respectively moved with small amounts. Further, NewXYZ is reverted to L*a*b value.

(3-2-7) Judgment of Completion

Here, judgment of completion is executed (Step S1407 in FIG. 14). Namely the judgment is executed whether the processing of 9*9*9 times are executed. If not completed, return to the processing of (3-2-5).

(3-2-8) Judgment of Completion

Here, judgment of completion is executed (Step S1408 in FIG. 14). Namely the judgment is executed whether the processing of every nine gray scales are executed. If not completed, return to the processing of (3-2-4).

(7-1) Calculation of Knew #1

Although in conventional method Knew is defined as, Knew=(1−α)*Kmin+α*Kmax, in the method proposed by the present embodiment, α is defined as below so that Kmax is adapted on the object gray axis and Kmin is adapted according as going farther from the gray axis.

(7-1-1) Value Setting lattice points to be calculated are set. This is repeated for 9*9*9*9 times.

(7-1-2) Calculation Between Black

Figure 15:
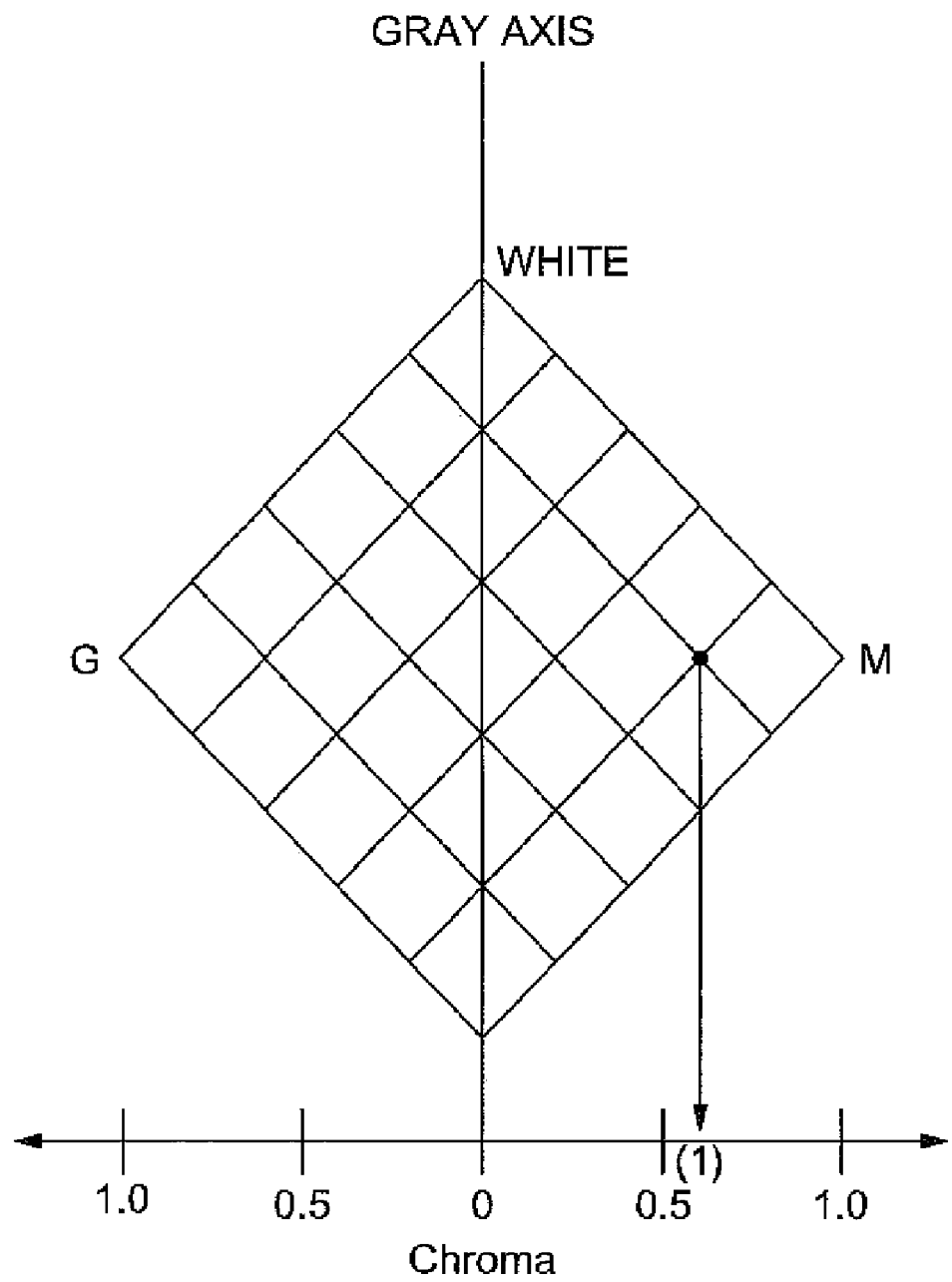
FIG. 15 is a schematic diagram showing the image processing of the embodiment of the present embodiment.

Lattice points are illustrated in FIG. 15. When lattice points are set in positions as shown in FIG. 15, the distance from the gray axis ((1) in FIG. 15) is referred as Chroma. The value of Chroma is normalized to 1.0 in maximum, and 0 at the point of intersection with L axis. In the graph where Chroma is taken in horizontal axis and α is taken in vertical axis and γ value are varied as FIG. 16, α is calculated at an intended γ value with the reference of Croma value (1) previously obtained in FIG. 15.

Figure 16:
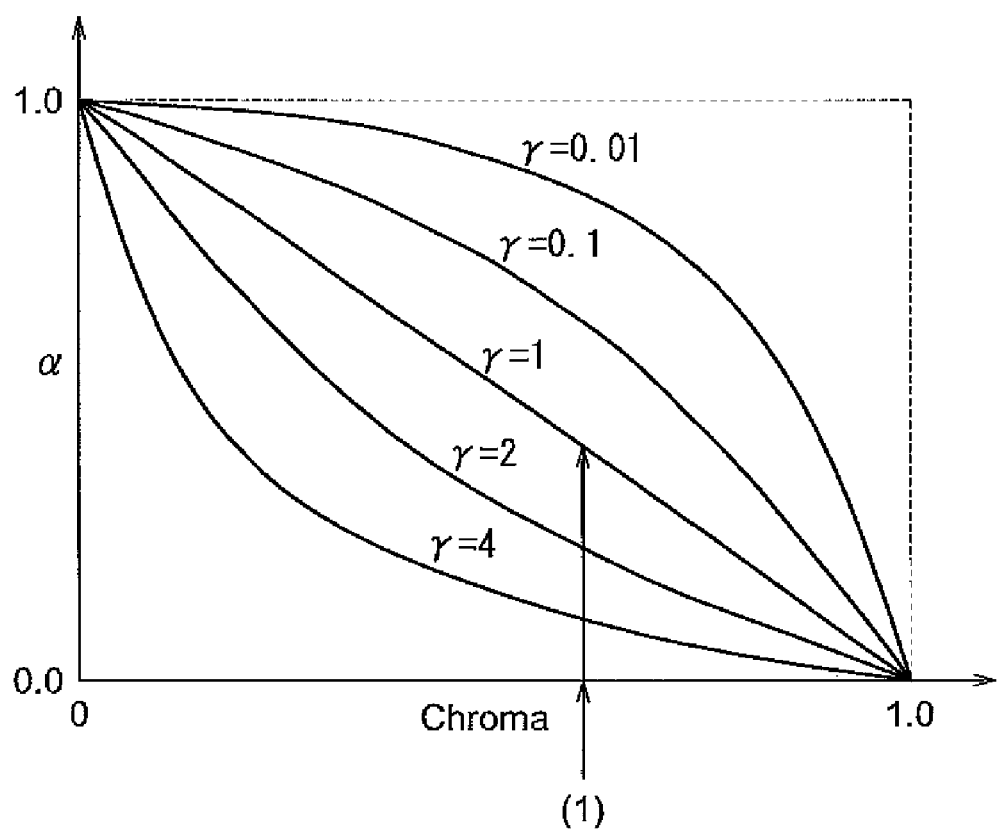
FIG. 16 is a schematic diagram showing the image processing of the embodiment of the present embodiment.

Here, when γ value in FIG. 16 is varied, the movement of a varies depending to Chroma. By applying these a to the calculation formula of Knew, it is realized that Kmax is used on the gray axis and Kmin is used according as going farther from the gray axis. Since Kmax is used on the gray axis, K is still preserved, and since K is decreased as going farther from the gray axis, roughness of the print image can be suppressed in flesh color reproduction and the like. Further the amount of K to be used can be controlled according to the γ value.

Other Embodiment

Since the numeric values used for the explanation of each embodiment are examples for conducting the specific explanations, the embodiments of the present invention are not restricted by these numeric values.

What is claimed is:

1. An image processing method for forming a color conversion table to convert plural input colors into output colors, comprising:

extracting color values of plural gray scales wherein in input and output characteristic data, a signal value of one color is variable and signal values of other colors are fixed;

creating a model with which difference values between input and output color values are outputted by inputting the extracted color values; and estimating the output color values corresponding to the input color values to create the color conversion table to convert plural input colors into output colors, after shifting the color values by adding or subtracting the difference values which are obtained by inputting the color values into the model with respect to every output color values, wherein outputting of the difference values is executed only when the gray scales vary, and changing of output data is performed by multiplying a ratio of a color value of the gray scale and a result of adding or subtracting the difference value.

2. The image processing method of claim 1, wherein the plural gray scales are K (black) mono-color gray scales in conditions of C(cyan)=M(magenta)=Y(yellow)=0, or any of gray scales of mono-colors including C (cyan) mono-color, M (magenta) mono-color, (yellow) mono-color, R(red) mono-color, G(green) mono-color, and B (blue) mono-color.

3. The image processing method of claim 1, wherein in the model, with respect to the difference value between the input and output color values, the difference value of a gray scale at the last step or the difference values at some of the gray scales in the last step are made to be maximum, and the difference value of a gray scale at the first step or the difference values at some of the gray scales in the first step are made to be zero, while the difference values of a gray scale between the first and last steps are obtained by linearly or nonlinearly interpolating between the maximum value and zero.

4. The image processing method of claim 1, wherein in the model, when color value of a prescribed gray scale is inputted the maximum difference value is outputted, and according to going apart from a chroma or an achromatic axis in the color value of the prescribed gray scale, the difference value is decreased.

5. An image processing device for forming a color conversion table to convert plural input colors into output colors, comprising:

an extraction section which extracts color values of plural gray scales wherein in input and output characteristic data, a signal value of one color is variable and signal values of other colors are fixed;

a model with which difference values between input and output color values are outputted by inputting the extracted color values; and an estimation section which estimates the output color values corresponding to the input color values to create the color conversion table, after shifting the color values by adding or subtracting the difference values which are obtained by inputting the color values into the model with respect to every output color values wherein outputting of the difference values is executed only when the gray scales vary, and changing of output data is performed by multiplying a ratio of a color value of the gray scale and a result of adding or subtracting the difference value.

6. The image processing device of claim 5, wherein the plural gray scales are K (black) mono-color gray scales in conditions of C(cyan)=M(magenta)=Y(yellow)=0, or any of gray scales of mono-colors including C (cyan) mono-color, M (magenta) mono-color, (yellow) mono-color, R(red) mono-color, G(green) mono-color, and B (blue) mono-color.

7. The image processing device of claim 5, wherein in the model, with respect to the difference value between the input and output color values, the difference value of a gray scale at the last step or the difference values at some of the gray scales in the last step are made to be maximum, and the difference value of a gray scale at the first step or the difference values at some of the gray scales in the first step are made to be zero, while the difference values of a gray scale between the first and last steps are obtained by linearly or nonlinearly interpolating between the maximum value and zero.

8. The image processing device of claim 5, wherein in the model, when color value of a prescribed gray scale is inputted the maximum difference value is outputted, and according to going apart from a chroma or an achromatic axis in the color value of the prescribed gray scale, the difference value is decreased.

* * * * *